J. H. RIVERS.
MACHINE FOR MOLDING AND DRYING PULP.
APPLICATION FILED SEPT. 19, 1910. RENEWED AUG. 1, 1914.
1,161,160.
Patented Nov. 23, 1915.
6 SHEETS—SHEET 2.
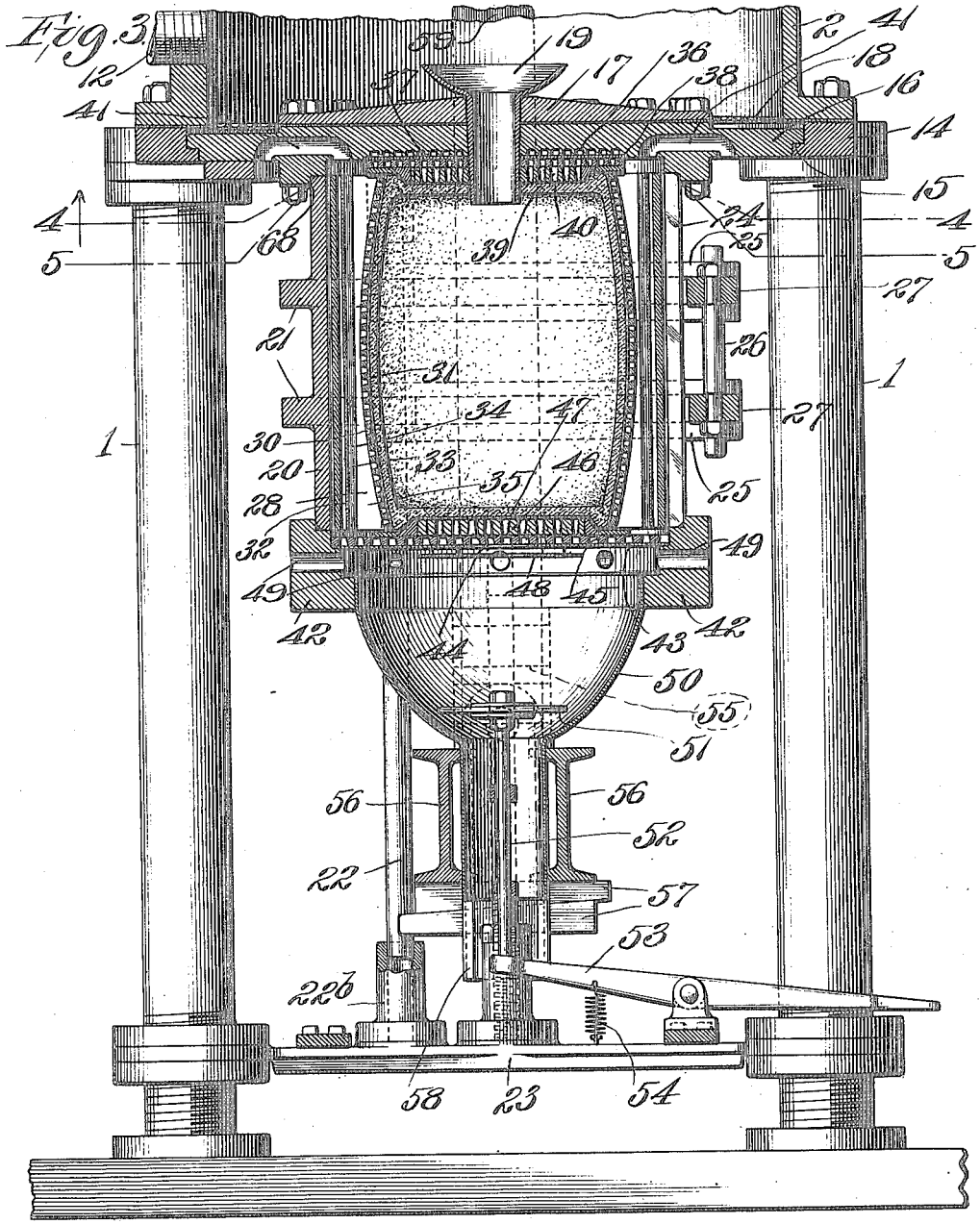
Inventor:
J. H. Rivers,
by Rippey & Kingsland
Attys.

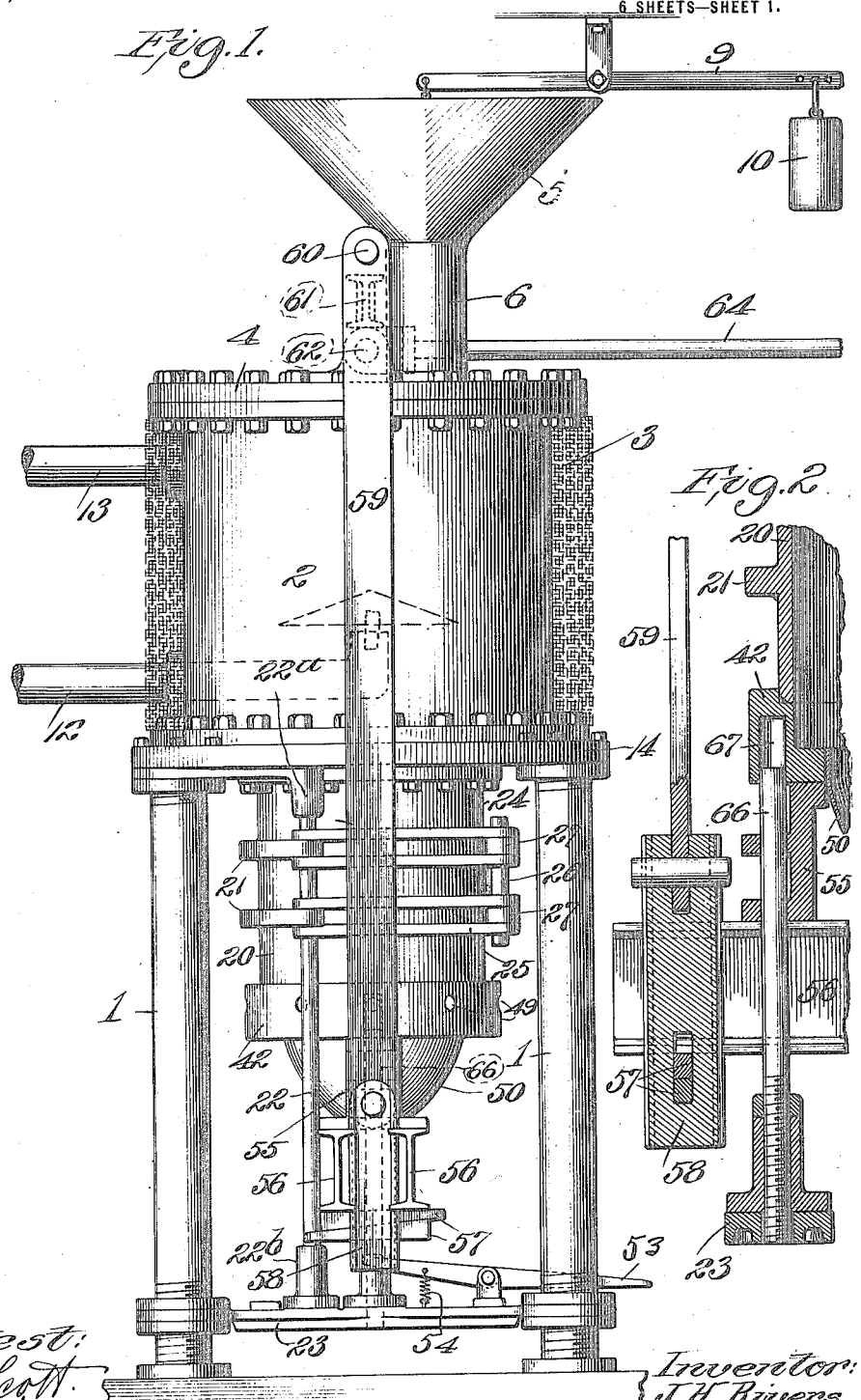

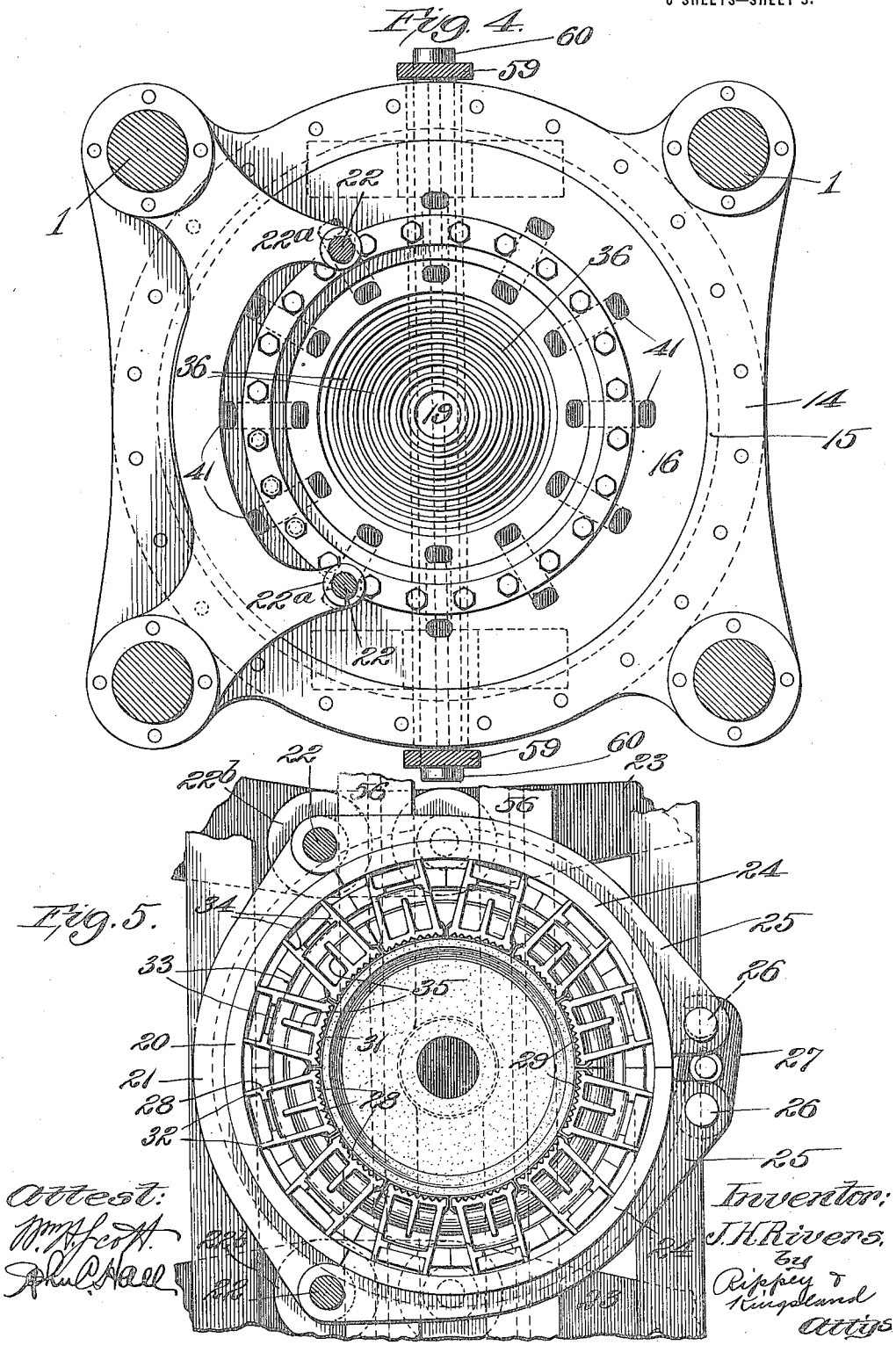

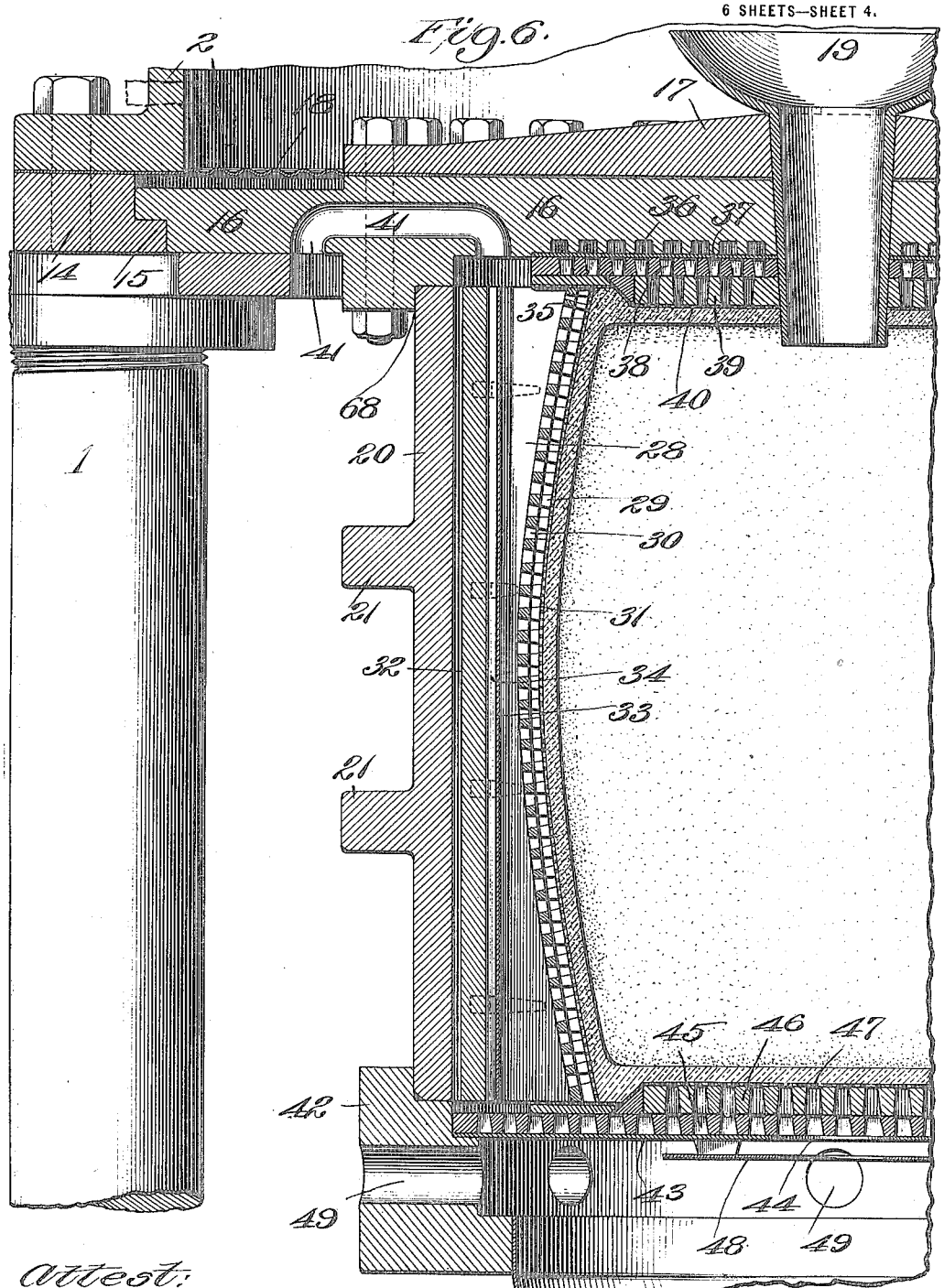

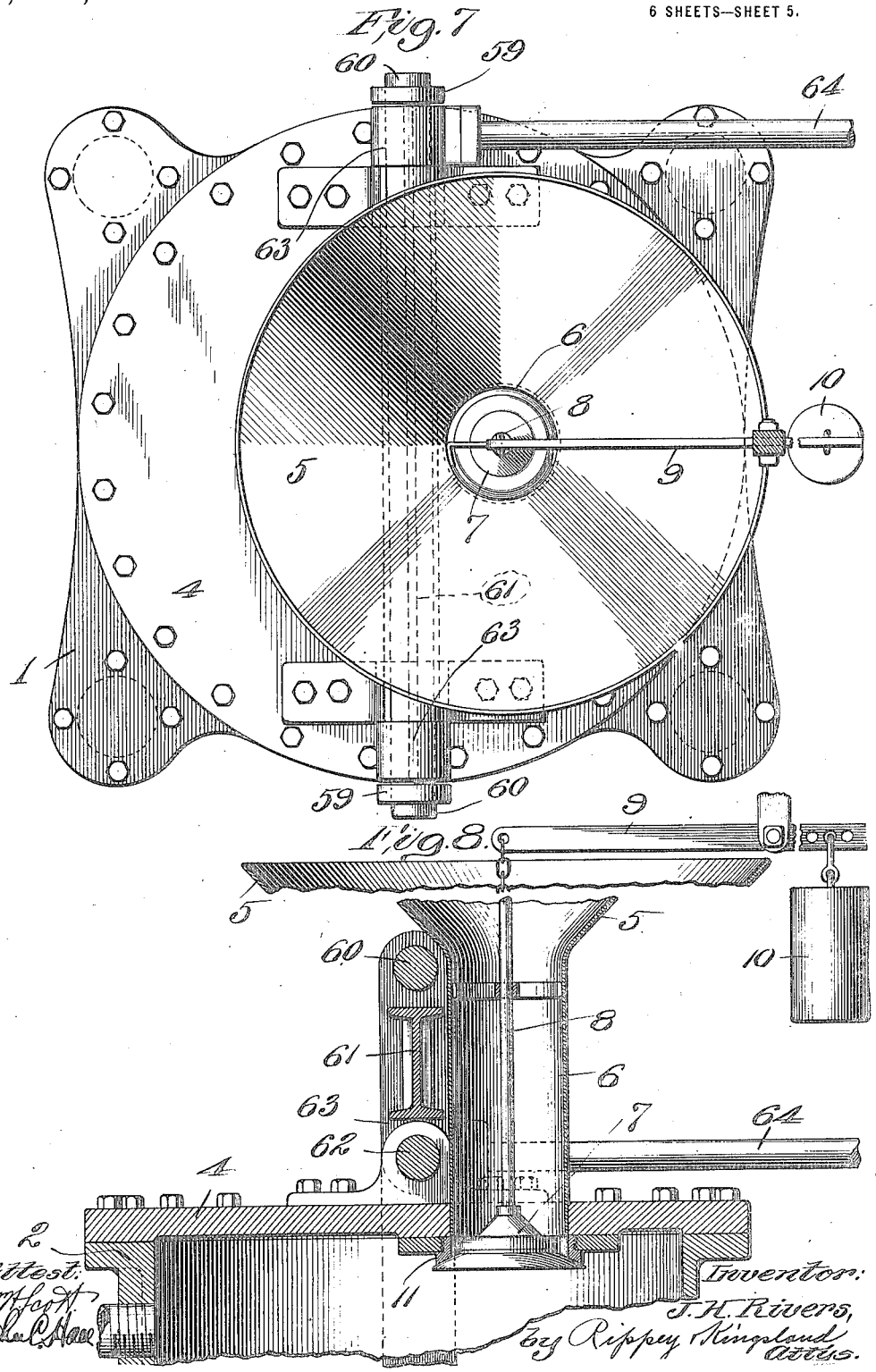

J. H. RIVERS.
MACHINE FOR MOLDING AND DRYING PULP.
APPLICATION FILED SEPT. 19, 1910. RENEWED AUG. 1, 1914.
1,161,160.
Patented Nov. 23, 1915.
6 SHEETS—SHEET 6.
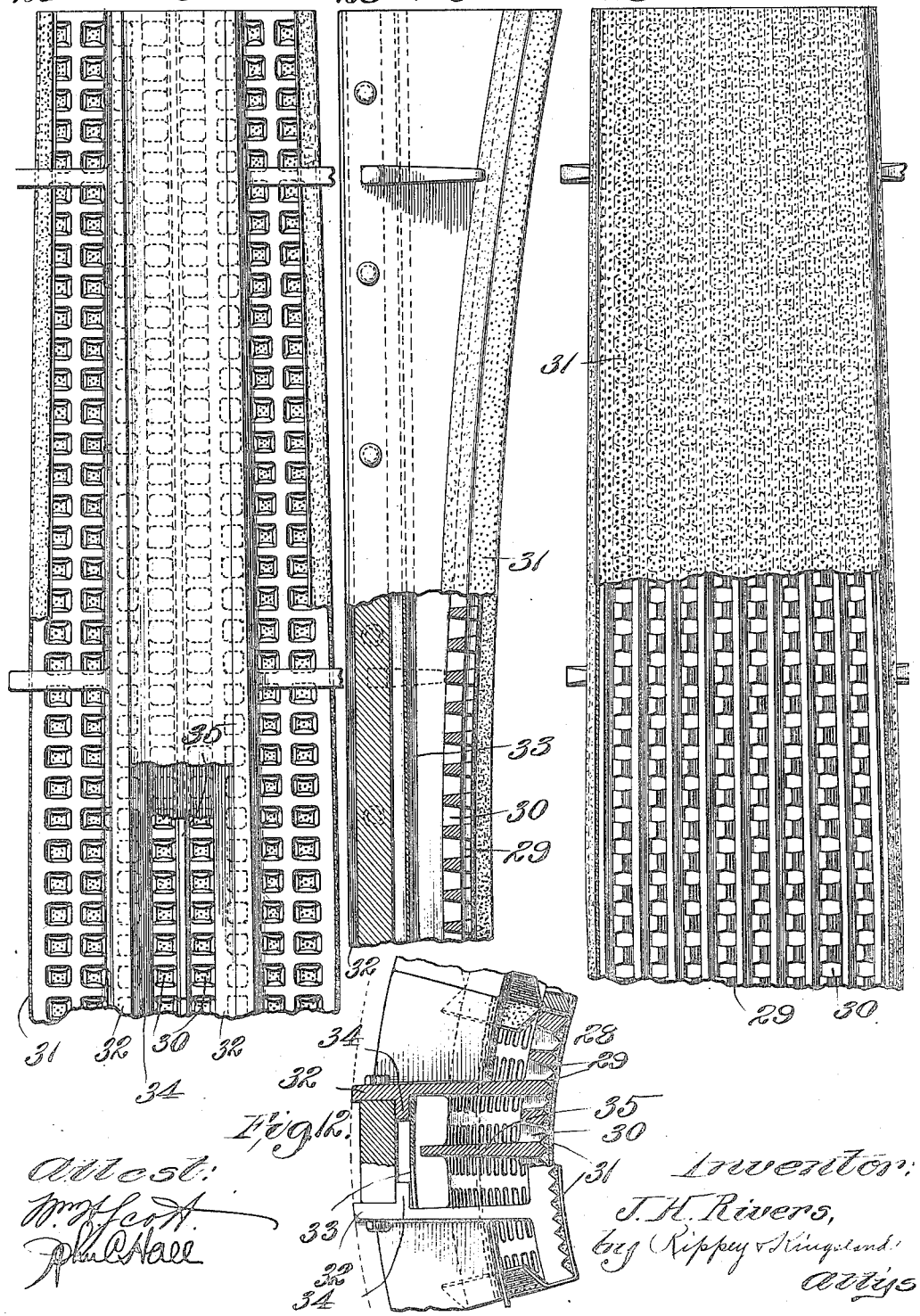

UNITED STATES PATENT OFFICE.

JULIAN H. RIVERS, OF NIOTAZE, KANSAS, ASSIGNOR, BY MESNE ASSIGNMENTS, TO UNIVERSAL FIBRE COMPANY, OF NEW YORK, N. Y., A CORPORATION OF DELAWARE.

MACHINE FOR MOLDING AND DRYING PULP. REISSUED 1,161,160.     Specification of Letters Patent.     Patented Nov. 23, 1915.

Application filed September 19, 1910, Serial No. 582,735. Renewed August 1, 1914. Serial No. 854,560.

*To all whom it may concern:*

Be it known that I, JULIAN H. RIVERS, a citizen of the United States, residing at Niotaze, Kansas, have invented a new and useful Improvement in Machines for Molding and Drying Pulp, of which the following is a specification.

This invention relates to machines for molding and drying pulp, and has for its object to produce a machine whereby it is possible to mold and dry objects composed of pulp and other ingredients.

In a specific sense the present invention consists of an advance improvement upon the apparatus described in Patent No. 804,432, issued to me November 14th, 1905. The apparatus constituting the subject-matter of the present invention is perfectly adapted for use in practising the process described in my said patent, and also the improved process described in an application for patent filed by me July 26, 1909, Serial No. 509,472. By use of the present improved machine, the process of said patent or of said application may be carried on with maximum efficiency and practically perfect articles may be formed.

Having these and other objects to be attained, a machine containing an embodiment of my invention is illustrated in the accompanying drawings, in which—

Figure 1 is a side elevation of the complete machine. Fig. 2 is a detail sectional view illustrating the arrangement of the parts whereby the bottom of the mold incasement is raised and lowered. Fig. 3 is a sectional view of the mold. Fig. 4 is a sectional view on the line 4—5 of Fig. 3 looking upwardly. Fig. 5 is a sectional view on the same line looking downwardly. Fig. 6 is an enlarged sectional view illustrating the construction of the mold. Fig. 7 is a plan view of the complete machine. Fig. 8 is a central, vertical, sectional view of the supply hopper and the upper portion of receiving tank. Fig. 9 is an exterior side elevation of one of the sections of a mold for producing containers such as barrels and other vessels. Fig. 10 is an edge view partially in section of the same part. Fig. 11 is an interior side elevation of the same part and portion of the reticulated surface being removed. Fig. 12 is a plan sectional view of one of the mold sections.

The machine comprises a supporting frame 1, carrying a container or tank 2 which may be inclosed by an electric heating jacket 3 whereby the tank and contents may be maintained at approximately uniform temperature. A top plate 4 is attached to the upper end of the tank 2 and constitutes a closure for the tank. A hopper 5 is provided with a tubular extension 6 which extends into an opening in the top plate 4. A valve 7 (Fig. 8) is supported by a rod 8 swinging from the end of a lever 9. A weight or other actuating device 10 acts upon the lever 9 effectively to hold the valve 7 in close adjustment against a gasket or valve-seat 11 as shown in Fig. 8. The liquid supply pipe 12 opens into the tank 2 near its bottom and a pressure supply pipe 13 opens into said tank near the top thereof.

The bottom of the tank includes a ring or frame piece 14 having an internal flange 15. A bottom plate 16 is provided with an exterior flange which shoulders upon the flange 15 and is supported thereby. A plate 17 is arranged upon the plate 16 and is rigidly secured thereto clamping onto a diaphragm 18, the outer edge of which is clamped between the ring 14 and the end of the tank 2. A space separates the outer edge of the plate 16 from the diaphragm 18 and from the lower end of the tank 2 permitting slight movement of said plate 16 as hereinafter described. The diaphragm 18 being of corrugated sheet metal permits movement of the bottom plate 16 while maintaining a perfect seal for the bottom of the tank. It is preferred that the plate 17 shall slope outwardly in all directions from its center as shown in Fig. 3. A funnel-shaped outlet 19 extends through the plates 16 and 17 and constitutes a passage for conducting the materials to be molded to the mold.

The mold includes an outer shell or incasement composed of a number of sections hinged together, and an interior mold structure supported a slight distance away from said shell. One of the sections 20 of the shell or incasement has a number of projections 21 fastened to rods 22, the ends of which are in guides which permit limited vertical movement of said rods. In the form shown the rods 22 have their upper ends in guides 22ᵃ in rigid connection with the tank 2 or some part attached thereto, and their lower ends in guides 22ᵇ attached to a frame 23. Other incasement sections 24 are hinged to the rods 22 by means of ribs or flanges 25 which are rigid with said sections 24. The adjacent ends of the ribs or flanges 25 support pins 26 upon one of which hooks 27 are supported, said hooks being operable to engage with the pin 26 on the adjacent section thereby to latch with the mold sections in close relation as shown in Fig. 5. The mold shown in the drawings is of a design for forming containers of barrel shape and includes a series of vertical sections or staves 28 on the inner face of which are vertical channels 29 (Fig. 11). These channels form attenuated ribs or ridges. Holes 30 are formed through the staves 28 at close intervals and at their inner openings extend across the base of those ribs which they intersect as shown in Fig. 11. In other words, the holes are the same width as the ribs forming the ribs which they intersect into series of projection. These holes increase in size outwardly so that the moisture being ejected therethrough will meet with no obstruction in its egress. A section of perforated or reticulated material 31 covers the inner surface of each stave pressing against the attenuated edges of the ribs and projections thereof. The edges of the reticulated sections 31 extend outwardly against the edges of the staves 28 and are then bent obliquely toward each other as shown in Fig. 12. Each of the staves 28 has rigid therewith outward extensions or flanges 32 whereby the staves are connected with the shell or incasement sections 20 and 24 and held in proper relation. The deflector plates 33 are mounted between the mold sections and the incasement 20—24 so that the outward flow of the liquid will be deflected. These deflector plates rest against projections 34 on the extensions 32 and are prevented from inward movement by intermediate projections 35 extending from the staves 28. (See Fig. 12). This completes the side walls of the mold.

One end of the mold is supported by the plate 16 constituting the bottom of the tank 2. In the under side of the plate 16 is a series of concentric grooves or channels 36 constituting air chambers which encircle the passage formed by the tank outlet 19. A thin metallic plate 37 closes these grooves or channels and is held in position by a frame or grid 38 against which bear the sections or staves plate 39, the construction of which is similar to that of the staves 28. Upon the inner surface of the plate 39 is a section 40 or reticulated material similar to the sections 31 so that the liquid within the mold may pass therethrough and thence into the chamber outside of the mold. From this chamber outlets 41 conduct a portion of the ejected liquid to any delivery point.

The bottom or opposite end of the mold includes a supporting frame 42 having a flange encircling the mold incasement 20—24 and holding said incasement closed when the mold is in use. A plate 43 is supported within the frame 42 and has a central opening 44 through which the liquid ejected from the mold passes to places of discharge. A frame 45 rests upon the plate 43 its construction being similar to the frame 38, and upon said frame 45 the frame or grid 46 is mounted. A section 47 of reticulated material is attached to the frame 46 and extends under the lower ends of the staves 28. Below the plate 43 deflector plates 48 are arranged and said plates serve to check and change the direction of flow of the liquid. Outlets 49 through the frame 42 permit outward flow of the liquid, but the capacity of said outlets is less than the capacity of the inlet 19 so that the mold and the chamber surrounding the mold will become filled with liquid during the formation of any article in the mold. A hopper 50 is arranged to receive the liquid which is ejected through the bottom of the mold. The outlet of said hopper is controlled by the valve 51 which may be operated in any suitable manner. In the embodiment shown the valve is mounted upon a rod 52 guided through the outlet opening of the discharge hopper 50 and resting upon the end of an operating lever 53. Said lever is actuated to idle position by a spring 54. Pressure upon the outer end of the lever 53 will raise the rod 52 and open the valve 51 permitting the liquid to discharge from the hopper.

I will now describe the operating mechanism whereby the mold is opened and closed. The frame 42 rests upon supporting blocks 55 (Figs. 1 and 2) said blocks being mounted upon horizontal beams 56. The ends of the beams 56 rest upon adjustable wedge blocks 57 which extend through blocks 58 swinging from the lower ends of the supporting links 59 arranged at opposite sides of the machine. By adjusting either one of the blocks 58 the beams 56 may be raised or lowered as required to arrange the parts in proper relation. The upper ends of the links 59 are connected by a rod 60. A rock shaft 62 extends across the top of the tank and arms 63 have their lower ends rigid with said shaft and their upper ends pivoted to the rod 60 and are connected by a beam 61. By rocking the shaft 62 the arms 63 may be moved to horizontal position which will lower the links 59 and the mold and other parts supported thereby. For this purpose an operating lever 64 is attached to the shaft 62 and may be operated to rock said shaft effectively to permit the links 59 and the parts supported thereby to move downwardly. In the position of the lever 64, shown in Figs. 1 and 8, the links 59 are held in their highest adjustment and the mold is closed ready for use. By raising the free end of the lever 64, the arms 63 will be swung to horizontal positions and the links 59 and the parts supported thereby will be lowered. This downward movement of the links 59 carries also the beams 56 and the mold which is supported thereon. Guide rods 66 (Fig. 2), which are attached to the frame 23 extend through projections on the blocks 55 and into holes 67 in the frame part 42, thereby acting as guides to prevent lateral oscillation of all the moving parts during their vertical movements. This downward movement of the bottom frame 42 also carries the entire mold, disengaging the mold incasement from its connection with the bottom of the supply tank, such engagement being shown at 68 in Figs. 3 and 6. Descent of the mold is stopped by the ends of the rods 22 abutting against the bottoms of the guides 22ᵇ which occurs just after the mold separates from the tank 2. The bottom frame 22 continues its downward movement until it is separated from the mold incasement and is stopped by the rods 66 which permit the said bottom to move farther than the rods 22 permit the mold to move. The mold may then be opened and the article therein may be removed.

In operating the machine, the mold is held in closed position and supported against the tank 2 as shown in Figs. 1 and 3. The water and suspended material, including pulp, and such other ingredients as may be desired, are admitted into the tank 2 through the hopper 5, preferably without pressure, A quantity of the liquid and suspended materials pass through the passage 19 into the mold and completely fills the mold. The liquid passes through the mold walls and completely fills the surrounding space between said mold and its incasement. said liquid also passing through the top and bottom of the mold. During this time the valve 51 is closed so as to retard the outward flow of the liquid which can escape only through the passages 41 and 49 during the time that said valve is closed. The combined capacity of the passages 41 and 49 is less than the capacity of the mold inlet 19, so that the mold and incasement will be kept filled prior to the application of the pressure mentioned below. This primary flow of the liquid to fill these spaces deposits a relatively thin layer of the pulp and other ingredients against the entire inner surface of the mold. After the primary layer has been formed in this way, air or steam pressure may be admitted into the tank 2 through the pipe 13 with such force and effect as to drive the remaining liquid and suspended materials from the tank 2 into the mold, the liquid passing through the walls of the mold while the suspended elements are firmly compacted and felted into a hollow article, the exterior of which is defined by the interior surface of the mold. About the time that the pressure is admitted into the tank 2, the valve 51 should be opened so as to afford free outlet for the ejected fluids. Should it be desirable the liquid and suspended elements in the tank 2 may be maintained in agitation either prior to or during the admission of the pressure. Said agitation may be effected by the admission of additional liquid through the pipe 12 which opens into the tank 2 near the bottom thereof. The pressure of the heated air or steam is maintained after the ejection of the liquid until the molded article has been properly dried, after which the mold may be lowered by operation of the lever 65 as previously described.

I am aware that there may be modifications in the construction and arrangement of the parts embodying the present invention without departure and scope of the invention.

I do not confine myself to specific features of construction or arrangement, but

What I claim and desire to secure by Letters Patent is—

1. In a machine of the character described, a tank arranged to contain the materials to be compacted, a mold, an incasement around said mold, deflector plates between said mold and said incasement, an inlet passage from said tank into said mold, and an outlet passage from said incasement, substantially as specified.

2. In a machine of the character described, a tank arranged to contain the materials to be compacted, a mold, an incasement around said mold, deflector plates between said mold and said incasement, an inlet passage for admitting materials to be compacted from said tank into said mold, an outlet passage from said incasement, and a valve controlling said outlet passage, substantially as specified.

3. In a machine of the character described, a tank for receiving the materials to be compacted, a mold, an incasement around said mold, deflector plates between said mold and said incasement and out of contact with said mold, a passage for delivering materials from said tank into said mold, a hopper communicating with said incasement, an outlet passage from said hopper, and a valve controlling said outlet, substantially as specified.

4. In a machine of the character described, a tank, a mold, links supported by said tank, and a lever operable effectively to cause said links to move said mold to operative adjustment, substantially as described.

5. In a machine of the character described, the combination with a tank, a mold, and links supporting said mold, of a lever for operating said links, and means operated by said lever for locking said mold, substantially as described.

6. In a machine of the character described, a mold, an incasement around said mold, and a deflector located between said mold and said incasement, substantially as described.

7. In a machine of the character described, a tank, a frame, a mold supported by said frame, links supporting said frame, and the lever operable to move said frame and mold effectively to engage said mold with said tank, substantially as described.

8. In a machine of the character described, a tank, a frame, a mold supported by said frame, devices supporting said frame and mold whereby said mold will be held in engagement with said tank, means for operating said supporting devices to permit said mold to become disengaged from said tank, and means for disengaging said mold from said frame, substantially as described.

9. In a machine of the character described, a tank, a mold, a passage from said tank into said mold, a supply pipe leading into said tank, a pressure supply pipe leading into said tank, an incasement around said mold, and outlet passages communicating with the interior of said incasement, substantially as described.

10. In a machine of the character described, a mold, an incasement around said mold, deflector plates between said mold, and incasement, a supply passage opening into said mold, and outlet passages from said incasement of smaller capacity than said supply passage, substantially as described.

11. In a machine of the character described, a tank, a frame, a mold supported by said frame, means for holding said mold in engagement with said tank, means for permitting said mold and said frame to move away from said tank, and means for disengaging said mold from its frame, substantially as described.

12. In a machine of the character described, a tank arranged to receive the materials to be compacted, a mold outside of said tank, a passage for delivering materials from said tank into said mold, an incasement inclosing said mold, discharge passages leading from said incasement, a hopper supporting said mold and incasement and arranged to receive materials discharged therefrom, means for moving said hopper to adjust said mold in operative or in inoperative position, a discharge outlet from said hopper, and means for varying the speed of discharge through said outlet, substantially as specified.

13. In a machine of the character described, a tank arranged to receive the materials to be compacted, a mold outside of said tank, a shaft mounted in bearings on said tank, links, a rod connecting said links, elements attached to said shaft and pivoted to said rod, a support for said mold carried by said links, a lever for operating said links to raise and lower said mold, and a passage from said tank into said mold, substantially as specified.

14. In a machine of the character described, a tank arranged to receive materials to be compacted, a mold, a series of pivoted parts supporting said mold, means for locking said mold in closed adjustment, links supporting said mold, means for operating said links to move said mold into position to receive materials from said tank, and a passage for delivering materials from said tank into said mold, substantially as specified.

15. In a machine of the character described, a mold, a series of hinged sections forming an incasement around said mold, deflectors located between said sections and said mold, and means for locking said sections to hold the mold closed, substantially as specified.

16. In a machine of the character described, a mold, a series of hinged parts constituting an incasement around said mold, means for locking said incasement in closed adjustment, deflectors located between said mold and said incasement, and a valve controlled outlet from said mold, substantially as specified.

17. In a machine of the character described, a tank arranged to contain materials to be compacted, a mold top attached to said tank, a frame, a mold side wall supported by said frame, links supporting said frame, a lever operable to move said frame and mold side wall effectively to engage said mold side wall against said mold top, and a passage for delivering the materials from said tank into said mold, substantially as specified.

18. In a machine of the character described, a tank arranged to contain the materials to be compacted, a frame, an annular mold supported by said frame, an incasement inclosing said mold, links supporting said frame, an outlet from said mold, means for controlling said outlet, and a lever operable to move said frame and mold effectively to engage said mold with said tank, substantially as specified.

19. In a machine of the character described, a tank arranged to receive the materials to be compacted, an annular mold, an incasement inclosing said mold, links supporting said mold, and incasement, a passage from said tank extending downwardly into said annular mold, a hopper arranged to receive the material discharged from said mold, an outlet from said hopper, a valve controlling said outlet, means for opening said valve, and means for operating said links to disengage said mold from said tank, substantially as specified.

20. In a machine of the character described, a tank arranged to receive the material to be compacted, an annular mold, a continuous passage from said tank into said mold, means for admitting fluid pressure into said tank and mold, and means for moving said mold away from said tank, substantially as specified.

21. In a machine of the character described, a tank arranged to receive the material to be compacted, an annular series of mold sections, an incasement for the mold formed by said sections, releasable connections holding said incasement closed, means for locking said mold and incasement in position to receive materials from said tank, and a continuous passage leading from said tank into said mold, substantially as specified.

22. In a machine of the character described, a tank arranged to receive the material to be compacted, a support, an annular series of mold sections carried by said support, an incasement for the mold formed by said sections, releasable connections for holding said incasement and mold closed, means for locking said incasement and mold in position to receive materials from said tank, a passage extending into said mold from said tank, and a lever operable to release said mold and incasement, substantially as specified.

23. In a machine of the character described, a tank arranged to receive the material to be compacted, a series of mold wall-sections, an incasement for inclosing the mold formed by said wall-sections, means for locking said mold and incasement in position to receive materials from said tank, a lever for releasing said mold and incasement, a discharge outlet from said mold and incasement, and means for varying the speed of flow through said outlet, substantially as specified.

24. In a machine of the character described, a tank arranged to receive the materials to be compacted, a heating jacket inclosing said tank, a support, a series of mold wall-sections carried by said support, an incasement for inclosing the mold formed by said wall-sections, releasable means for holding said incasement closed, means for locking said mold and incasement in position to receive materials from said tank, a passage leading from said tank into said mold, a discharge outlet from said mold and incasement, and means for regulating the quantity of discharge through said outlet, substantially as specified.

25. In a machine of the character described, a tank arranged to receive the materials to be compacted, a mold arranged below said tank, a movable plate between said tank and said mold, a passage for delivering material from said tank to said mold, an incasement inclosing said mold, discharge passages leading from said incasement, and a chamber arranged below said mold and said incasement for receiving the materials discharged therefrom, substantially as specified.

26. In a machine of the character described, a tank arranged to receive materials to be compacted, a movable closure for the lower end of said tank comprising a movable plate and a flexible sheet, a mold arranged below said tank, a passage from said tank to said mold supported by said closure, and discharge passages leading from said mold, substantially as specified.

27. In a machine of the character described, a tank for receiving materials to be be compacted, a mold supported below said tank, a movable plate between said mold and said tank, and a passage from said tank to said mold through said partition, substantially as specified.

28. In a machine of the character described, a container wall and top, a bottom for the container, a support on which said bottom is movable with respect to said container wall, means preventing leakage of the materials between said wall and said movable bottom, a mold below said bottom, means for supporting said mold against said bottom, and a passage through said bottom for discharging materials into said mold, substantially as described.

29. In a machine of the character described, a container comprising a wall, a bottom, means for supporting said bottom whereby said bottom is movable with respect to said wall, means preventing leakage of the materials between said wall and said movable bottom, a mold, and a passage leading from said container into said mold through said movable bottom, substantially as described.

30. In a machine of the character described, the combination with a container and a mold, of a movable partition between said container and said mold, means for supporting said partition whereby movement thereof with respect to said container is permitted, and a passage through said movable partition from said mold, substantially as described.

31. In a machine of the character described, the combination with a container, and a mold section supported by said container, of mold walls, a movable support on which said mold walls are mounted, means for moving said mold walls to and from said mold section, and a passage for conducting materials from said container into the mold, substantially as described.

32. In a machine of the character described, a tank arranged to receive the materials to be compacted, a mold supported below said tank, a flexible partition with passage therethrough between said tank and said mold, which flexible partition has an area greater than the area of said mold, producing a differential pressure, said pressure causing increased tightness of joints with increase of pressure.

33. In a machine of the character described, a container, side and end walls forming a jointed mold to withstand internal pressure, a passage for admitting pressure from said container into said mold, and means whereby increase of pressure in said container increases tightness of the joints between certain of said walls of said mold.

34. In a machine of the character described, a tank arranged to receive materials to be compacted, a movable bottom wall for said tank, a mold supported below said tank, a passage for conducting materials and the pressing fluid from said tank into said mold, a top for said mold supported by said bottom wall, and means whereby increase of pressure in said tank will increase the tightness of the joint between the top of said mold and the remaining portions thereof.

35. In a machine of the character described, a tank arranged to receive the materials to be compacted, a movable bottom wall for said tank, a top mold wall supported by said bottom wall, a mold supported below said tank, means for supporting said mold against said top mold wall, a passage through said bottom of said tank and through said top mold wall for conducting materials and the pressure from said tank into said mold, and a passage for admitting pressure into said tank.

36. In a machine of the character described, a tank arranged to receive the materials to be compacted, means for admitting pressure into said tank to force the materials therefrom, a mold supported below said tank for receiving the materials forced from said tank, a movable partition between said tank and said mold having a passage for admitting the materials from said tank to said mold, and a support upon which said movable partition is joined with increased tightness in proportion to the increase of pressure within said tank.

In testimony whereof I have signed this specification in the presence of two subscribing witnesses.

JULIAN H. RIVERS.

Witnesses:
FRANKLIN MILLER,
JOHN D. RIPPEY.